United States Patent Office 3,023,222
Patented Feb. 27, 1962

3,023,222
EPOXIDES OF BICYCLIC ACETALS
Howard R. Guest, Charleston, Joe T. Adams, St. Albans, and Ben W. Kiff, Ona, W. Va., assignors to Union Carbide Corporation, a corporation of New York
No Drawing. Filed July 10, 1958, Ser. No. 747,585
1 Claim. (Cl. 260—340.7)

This invention relates to a new class of organic compounds which are useful in the manufacture of casting and coating resins. In a particular aspect, this invention relates to epoxide derivatives of unsaturated bicyclic acetals.

The compounds of this invention may be represented by the general formula:

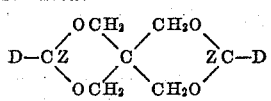

wherein each substituent D is an epoxy-containing group and Z represents members selected from the group consisting of hydrogen and alkyl. Substituent D can contain nitrogen, silicon, phosphorus, sulfur, halogen and the like, in addition to carbon, hydrogen and oxygen. Besides at least one epoxide group

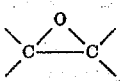

in each substituent, other groups can be present such as ether, ester, amide, imide, nitrile, phosphoric acid ester and sulfuric acid ester groups, and the like.

In the preferred compounds of this invention represented by the above general formula, each substituent D is composed of from two to eighteen carbon atoms, one oxygen atom and hydrogen, and said oxygen atom is attached to vicinal carbon atoms, and any carbocyclic nucleus contained in said D is between three and six carbon atoms in size; and Z is selected from the group consisting of hydrogen and lower alkyl groups containing between one and four carbon atoms. By "carbocyclic nucleus" is meant a ring structure composed of carbon atoms, such as cyclopropyl, cyclopentyl, cyclohexyl, phenyl, and the like.

The epoxide compounds of this invention find application as intermediates in the production of valuable synthetic resins. The presence of at least two reactive epoxide groups makes the compounds amenable to homopolymerization and copolymerization.

The epoxide compounds are produced by the epoxidation of spirobi(meta-dioxane) derivatives which have olefinic substituents in the three- and nine-positions. By way of illustration, the following reaction scheme is an example of a method useful for producing the novel compounds of this invention:

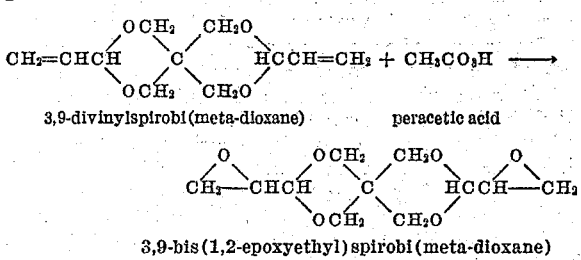

3,9-divinylspirobi(meta-dioxane)     peracetic acid 3,9-bis(1,2-epoxyethyl)spirobi(meta-dioxane)

The spirobi(meta-dioxane) compounds particularly preferred as starting materials are those which have one olefinic hydrocarbon substituent in the three-position and in the nine-position, each of said olefinic substituents containing between two and eighteen carbon atoms. The olefinic hydrocarbon substituents can be straight-chain or branched, and said substituents can contain cyclic groups ranging up to six carbon atoms in ring size. From the foregoing description, it is apparent that a wide variety of 3,9-substituted spirobi(meta-dioxane) starting materials are useful in this invention. One group of these materials can be described by Formula A:

A. 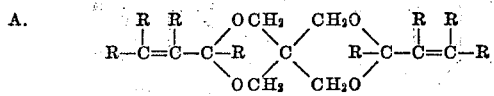

wherein R is hydrogen or lower alkyl groups containing from one to four carbon atoms. Preferred compounds that are representative of this group include those which have only methyl or ethyl substituents (1) on the vinyl groups, or have no substituents at all (2):

(1) 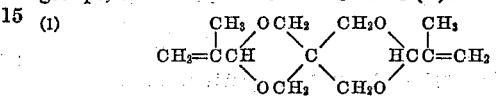

3,9-(α,α'-dimethyl)divinylspirobi(meta-dioxane)

(2) 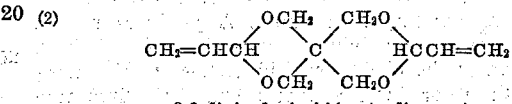

3,9-divinylspirobi(meta-dioxane)

Another group of spirobi(meta-dioxane) starting materials can be described by Formula B:

B. 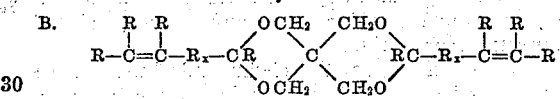

wherein R is hydrogen or lower alkyl groups containing from one to four carbon atoms, and $R_x$ is an alkylene group containing from one to sixteen carbon atoms. Preferred compounds that are representative of this group include those which are unsubstituted (3), or have one or two lower alkyl substituents (4):

(3) 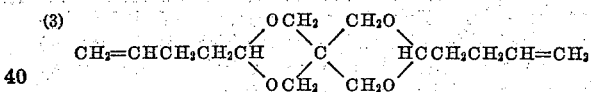

3,9-bis(3-butenyl)spirobi(meta-dioxane)

(4) 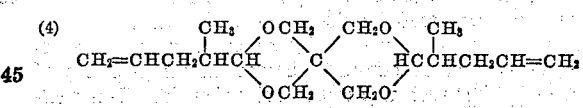

3,9-bis(1-methylbuten-3-yl)spirobi(meta-dioxane)

Another group of spirobi(meta-dioxane) starting materials can be described by Formula C:

C. 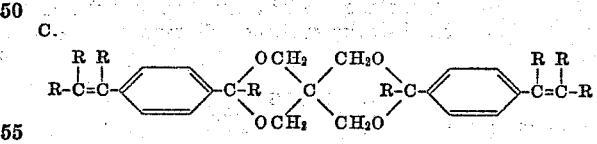

wherein R is hydrogen or lower alkyl containing from one to four carbon atoms, the total number of carbon atoms in each phenyl radical not exceeding eighteen in number. Representative of this group of compounds is 3,9-(p-vinylphenyl)spirobi(meta-dioxane).

Another group of spirobi(meta-dioxane) starting materials can be described by Formula D:

D. 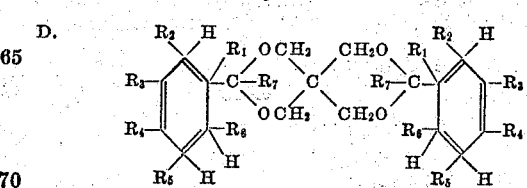

wherein $R_1$ through $R_7$ are taken from the group consisting of hydrogen and lower alkyl containing from one to four carbon atoms, the total number of carbons in $R_1$ through $R_6$ not exceeding twelve on each ring. Preferred compounds of this group include those which are unsubstituted (5), or have one or two lower alkyl substituents (6):

5.

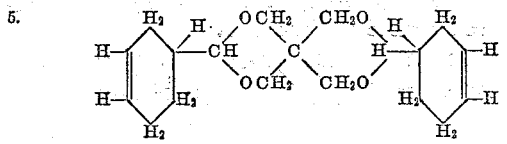

3,9-bis(cyclohexen-3-yl)spirobi(meta-dioxane)

6.

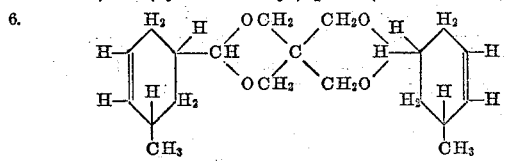

3,9-bis(5-methylcyclohexen-3-yl)spirobi(meta-dioxane)

Epoxidation of the olefin positions in the spirobi acetals corresponding to Formula A produces spirobi acetal derivatives containing epoxyaliphatic substituents. Epoxidation of the olefinic spirobi acetals corresponding to Formula B produces spirobi acetal derivatives containing epoxycycloaliphatic substituents. Epoxidation of the olefinic spirobi acetals represented by Formula C and Formula D produces spirobi acetal derivatives containing epoxyalkaryl substituents and epoxycyclohexyl substituents, respectively.

It is not necessary that the olefinic substituent in the three-position be the same as that in the nine-position. Spirobi(meta-dioxane) derivatives that have dissimilar three- and nine-substituents are as convenient to synthesize as those which have similar substituents.

The spirobi(meta-dioxane) starting materials of this invention are conveniently produced by the condensation of olefinically-unsaturated aldehydes and ketones with pentaerythritol. There are a large number of olefinically-unsaturated aldehydes and ketones which can be reacted with pentaerythritol to give the spirobi(meta-dioxane) compounds useful as starting materials.

The preferred unsaturated spirobi(meta-dioxane) compounds are prepared by the condensation of a mole of pentaerythritol with two moles of an unsaturated aldehyde or ketone, or mixtures thereof, in the presence of an acid catalyst such as p-toluenesulfonic acid. This well-known synthetic method is published in detail in Schulz and Wagner, Angew. Chemie, 62, 118 (1950). The following reaction schemes are particular illustrations of the general synthetic method. When acrolein is used an unsubstituted 3,9-divinylspirobi(meta-dioxane) is obtained:

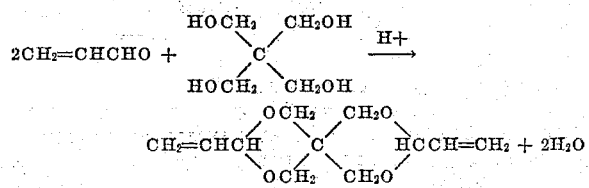

When the condensation is conducted with (a) alpha-methyl acrolein or (b) crotonaldehyde, then methyl-substituted 3,9-divinylspirobi(meta-dioxanes) are obtained:

(a)
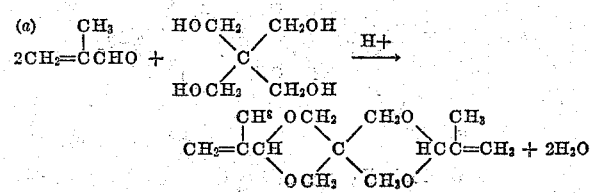

(b)
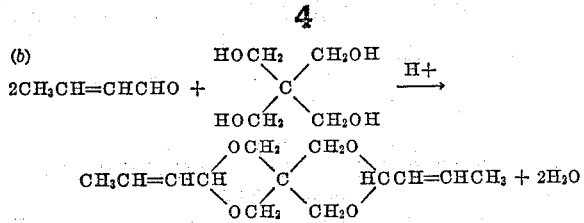

When the condensation is conducted with an unsaturated ketone, then the three- and nine-positions of the spirobi(meta-dioxane) nucleus obtained have two substituents rather than one:

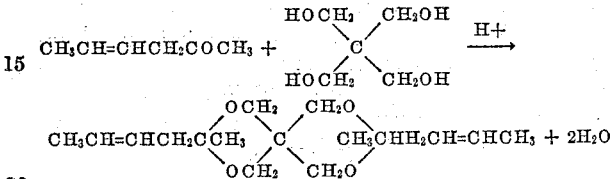

It is not necessary that the unsaturated aldehyde or ketone reacted with pentaerythritol be pure or a single species. Mixtures of unsaturated aldehydes and/or ketones may be condensed with pentaerythritol. The resulting products are mixtures of 3,9-olefinically-substituted spirobi(meta-dioxane) compounds which can be resolved into pure components or which can be used in the crude form directly in the processes of this invention.

As stated earlier, the novel epoxides of this invention are produced by the reaction of 3,9-olefinically unsaturated spirobi(meta-dioxane) derivatives with an epoxidizing reagent. Any suitable epoxidizing reagent may be used which affords a good yield of product and which does not complicate product recovery, such as peracetic acid, acetaldehyde monoperacetate, perbenzoic acid, monoperphthalic acid, pertrichloroacetic acid, and the like. Peracetic acid is the preferred oxidizing agent because it is economically prepared in high purity, and it reacts smoothly to give excellent yields of epoxides.

The epoxidation process of the invention is readily accomplished by adding a solution of peracid in an inert solvent, such as ethyl acetate, ether or acetone, to the unsaturated spirobi(meta-dioxane) compounds. The reaction temperature is not necessarily critical and can vary between about 0° C. and 150° C., with 10° C. to 85° C. being the preferred range. The length of time necessary for a reaction to go to completion is directly dependent on the peracid used, the reaction temperature and on the particular spirobi(meta-dioxane) compound being oxidized. The reaction time can vary between 1 and 100 hours. The effect of temperature on the reaction rate is such that in the lower range of temperatures twenty or more hours may be required for completion of the reaction. Generally, an increase in the reaction temperature decreases the optimum reaction time. The temperature selected for a given epoxidation will be governed by the reaction rate and yield of product desired.

The amount of epoxidizing agent employed in the process of the present invention is not critical. An excess of either olefinic acetal or peracetic acid can be employed if desired. It is preferred however to employ an excess of epoxidant to insure complete epoxidation of the starting material. When an excess of epoxidizing agent is employed, it is preferred that the amount is approximately a 10 percent to 20 percent excess above that theoretically required for complete epoxidation. Sometimes however it can be advantageous to employ an excess of olefinic acetal in the event that a monoepoxide is desired. A monoepoxide compound would contain an olefin group as well as an epoxide group. These two dissimilar groups are capable of forming polymers by entirely different reaction mechanisms. These compounds can be subjected to conditions whereby polymerization occurs through one group to the exclusion of polymerization through the other group. The resulting polymer can then be further polymerized under different conditions through the unaffected second group.

The epoxide products may be recovered by stripping off solvents and any other volatile components, such as the acid by-product from a peracid, and isolating the desired epoxides as a residual material in the distillation vessel. In some cases, the adding of azeotroping solvents facilitates the removal of volatile materials. For most purposes, the recovered epoxide products may be used without further purification in polymerization reactions and the like. If it is necessary to purify the reaction product or to resolve a reaction mixture into its components, then a distillation step or a recrystallization step is carried out, depending on which method is applicable in a particular case. Distillation purification steps are preferably conducted in a molecular still due to the high temperatures required for distilling these products in conventional distillation equipment.

The following examples will serve to illustrate the best modes presently contemplated for carrying out the process for producing the novel products of this invention.

The analysis for the epoxy group content of an epoxide sample is based upon its reaction with pyridine hydrochloride to form pyridine and the corresponding chlorohydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of bromocresol purple indicator (0.15 gram per 100 milliliters of methanol) added, and the mixture titrated to a permanent blue endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The analyses for determining epoxidant, that is, peracetic acid or acetaldehyde monoperacetate, content can be performed, for example, by introducing one to 1.5 grams of a sample of unknown epoxidant concentration into a flask containing a mixture of 60 milliliters of 50 weight percent aqueous sulfuric acid solution and five milliliters of a saturated potassium iodide solution. The flask is swirled to mix the solutions and then titrated immediately with an 0.1 N aqueous sodium thiosulfate solution to a colorless endpoint. From the titration data thus obtained, a determination of epoxidant content can be made.

EXAMPLE 1

*The Synthesis of 3,9-Bis(1,2-Epoxyethyl)Spirobi (Meta-Dioxane)*

A quantity of 3,9-divinylspirobi(meta-dioxane) (212 grams, 1.0 mole) in a reaction flask was heated to a temperature of 43° C. with stirring. A solution of peracetic acid (182.4 grams, 2.4 moles) in ethyl acetate (560 grams) was added to the unsaturated acetal in the flask over a period of eight minutes at a reaction temperature of 45° C. to 60° C. After the addition was completed, the temperature of the mixture was raised to 83° C. and maintained at this level for four hours, at which time an analysis of a sample indicated that 98 percent of the peracetic acid had been consumed.

The reaction mixture was allowed to cool to a temperature of 20° C. whereupon three equivalents of sodium carbonate were added and stirring was continued for an additional half hour. The reaction mixture was filtered and the filtrate was stripped at a temperature of 65° C. and a pressure of 2 millimeters of mercury. The residue contained 3,9-bis,1,2-epoxyethyl)spirobi(meta-dioxane).

EXAMPLE 2

*The Synthesis of 3,9-Bis(1,2-Epoxypropyl)Spirobi (Meta-Dioxane)*

A 23 percent solution (730 grams) of peracetic acid (167 grams, 2.2 moles) in ethyl acetate was added over a period of one-half hour to a reaction flask containing 3,9-bis(1-propenyl)spirobi(meta-dioxane) (240 grams, 1.0 mole) at a temperature of 40° C. to 48° C. The reaction temperature was maintained at 40° C. to 45° C. for six hours, then the reaction medium was allowed to cool to room temperature. The reaction mixture was analyzed for the quantity of peracetic acid remaining and it was calculated that 1.8 moles of peracetic acid had reacted with the unsaturated spirobi(meta-dioxane). The reaction mixture was distilled at a temperature of 103° C. and a pressure of 5 millimeters of mercury until all the volatile components were removed. The residual product (270 grams) was analyzed for epoxide content and was found to contain 91.5 percent of 3,9-bis(1,2-epoxypropyl)spirobi(meta-dioxane). This product crystallized to give a solid which melted at 76° C. A final diepoxide product yield of 88 percent was obtained.

Analysis.—Calc. for $C_{13}H_{20}O_6$: C, 57.34%; H, 7.40%. Found: C, 57.70%; H, 7.67%.

EXAMPLE 3

*The Synthesis of 3,9-Bis(1,2-Epoxy-1-Methylethyl) Spirobi(Meta-Dioxane)*

A 24.3 percent solution (688 grams) of peracetic acid (167 grams, 2.2 moles) in ethyl acetate was added over a period of one-half hour to a reaction flask containing 3,9-di-isopropenylspirobi(meta-dioxane) (240 grams, 1.0 mole) which was being stirred at a temperature of 40° C. to 45° C. The reaction was continued for 72 hours at a temperature of 25° C. to 30° C., then the reaction mixture was analyzed to determine how much peracetic acid remained unreacted. It was found that 1.75 moles of peracetic acid had been consumed in the reaction. The reaction mixture was then distilled to remove all components volatile at a temperature of 140° C. and a pressure of 10 millimeters of mercury. By epoxide analysis it was determined that the residual product (269 grams) contained 84.5 percent 3,9-bis(1,2-epoxy-1-methylethyl)spirobi(meta-dioxane). This was 86 percent of the theoretical yield of diepoxide.

Analysis.—Calc. for $C_{13}H_{20}O_6$: C, 57.37%; H, 7.35%. Found: C, 57.80%; H, 7.25%.

EXAMPLE 4

*The Synthesis of 3,9-Bis(1,2-Epoxy-1-Ethylpentyl) Spirobi(Meta-Dioxane)*

A reaction flask was charged with 3,9-bis(1-ethyl-1-pentenyl)spirobi(meta-dioxane) (176 grams, 0.5 mole) and the contents were heated to a temperature of 40° C. to 42° C. with stirring. Over a period of one-half hour, a 23.4 percent solution (390 grams) of peracetic acid (91.2 grams, 1.2 moles) in ethyl acetate was added to the reaction flask. The reaction was continued for four hours at a temperature of 40° C. An analysis of the reaction mixture showed that 0.9 mole of peracetic acid was consumed.

The reaction product was then fed into a distillation apparatus that contained ethylbenzene refluxing at 30° C. and a pressure of 23 millimeters of mercury and during the addition, 1400 grams of acetic acid, ethyl acetate and ethylbenzene were distilled. The ethylbenzene product solution remaining in the apparatus was then submitted to a distillation to remove all material volatile at a temperature of 60° C. and a pressure of 8 millimeters of mercury. A residual product (213 grams) was recovered which had a refractive index of 1.4746 at 30° C. and a specific gravity of 1.052 at 20° C. It was determined by epoxide analysis that 52.6 percent of the residual product was 3,9-bis(1,2-epoxy-1-ethylpentyl)spirobi(meta-dioxane). This corresponded to 58 percent of the theoretical yield of diepoxide. The amount of diepoxide in the residual product was increased to 66.4 percent by removing components of the product mixture which were volatile at a distillation temperature of 106° C. and a pressure of 5 millimeters of mercury.

EXAMPLE 5

*The Synthesis of 3,9-Bis(3,4-Epoxybutyl)Spirobi (Meta-Dioxane)*

A reaction flask was charged with 3,9-bis(3-butenyl)-spirobi(meta-dioxane) (134 grams, 0.5 mole) and the contents were stirred at a temperature of 40° C. A 24.8 percent solution (368 grams) of peracetic acid (91.2 grams, 1.2 moles) in ethyl acetate was added dropwise to the contents in the reaction flask. The reaction mixture was maintained at a temperature of 30° C. to 38° C. for a period of twenty-four hours, then it was fed over a period of three hours to ethylbenzene which was refluxing at 41° C. and a pressure of 25 millimeters of mercury. Ethyl acetate, acetic acid and some ethylbenzene were continuously distilled from the reaction medium during the feed period. The ethylbenzene product solution was concentrated by removing the components volatile at a distillation temperature of 60° C. and a pressure of 5 millimeters of mercury. The residual product (207 grams) had a refractive index of 1.4904 at 30° C., a specific gravity of 1.146 at 20° C. and a molecular weight of 317 by the Menzies-Wright method (theoretical: 300). An epoxide analysis indicated that the residual product contained 65.6 percent of 3,9-bis(3,4-epoxybutyl)spirobi(meta-dioxane). This corresponded to 90.6 percent of the theoretical yield of diepoxide.

EXAMPLE 6

*The Synthesis of 3,9-Bis(3,4-epoxycyclohexyl)Spirobi-(Meta-Dioxane)*

A 24 percent solution (760 grams) of peracetic acid (182.4 grams, 2.4 moles) in ethyl acetate and 3,9-bis(3-cyclohexenyl)spirobi(meta-dioxane) (320 grams, 1.0 mole) were added together over a period of two and one-quarter hours at a temperature of 22° C. to 25° C. in a manner and in an apparatus as described in the previous examples. The reaction was allowed to continue for 21 hours at a temperature of 10° C. to 25° C. An analysis indicated that 1.9 moles of peracetic acid had been consumed at this point. Then acetic acid and ethyl acetate were removed from the reaction products by feeding the solution to refluxing ethylbenzene (44° C. at a pressure of 25 millimeters of mercury) and continuously distilling off the volatile components. The ethylbenzene product solution was concentrated by vacuum distillation at a temperature of 60° C. and a pressure of 2 millimeters of mercury. The residual product (408 grams) was analyzed for epoxide groups and was found to contain 63 percent of 3,9-bis(3,4-epoxycyclohexyl)spirobi(meta-dioxane). This corresponded to 72 percent of the theoretical yield of diepoxide.

EXAMPLE 7

This example illustrates the utility of a compound of this invention as a reactive component in a condensation polymerization reaction.

A small amount of 3,9-bis(1,2-epoxy-1-methylethyl)-spirobi(meta-dioxane) (1.0 gram) was mixed with two drops of a 20 percent solution of potassium hydroxide in ethylene glycol, which is a catalyst concentration of about 0.8 percent based on the weight of the diepoxide. The resulting mixture formed a gel after four minutes of heating at a temperature of 160° C. After a total cure of twelve hours at 160° C., there was obtained a brown, tough resin wtih a Barcol hardness [1] of 36.

What is claimed is:
3,9-bis(1,2-epoxy-1-methylethyl)spirobi(meta-dioxane).

References Cited in the file of this patent

UNITED STATES PATENTS

| | | |
|---|---|---|
| 1,988,448 | Hopff et al. | Jan. 22, 1935 |
| 2,870,171 | Gable | Jan. 20, 1959 |
| 2,895,962 | Fischer | July 21, 1959 |

[1] Barcol Impressor GYZJ 934-1.

UNITED STATES PATENT OFFICE
CERTIFICATE OF CORRECTION

Patent No. 3,023,222                            February 27, 1962

Howard R. Guest et al.

It is hereby certified that error appears in the above numbered patent requiring correction and that the said Letters Patent should read as corrected below.

Column 3, lines 7 to 12, the formula should appear as shown below instead of as in the patent:

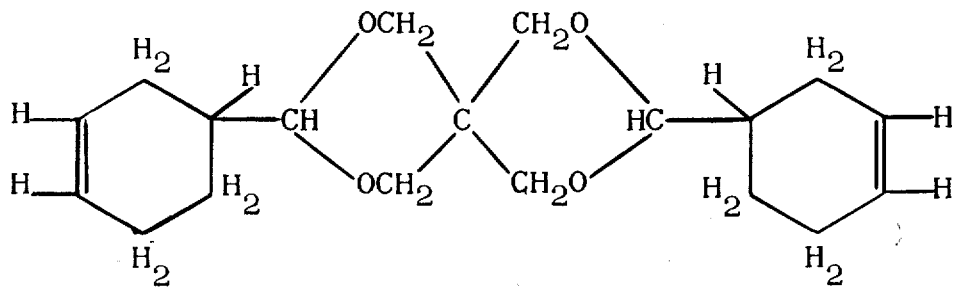

same column 3, lines 14 to 20, the formula should appear as shown below instead of as in the patent:

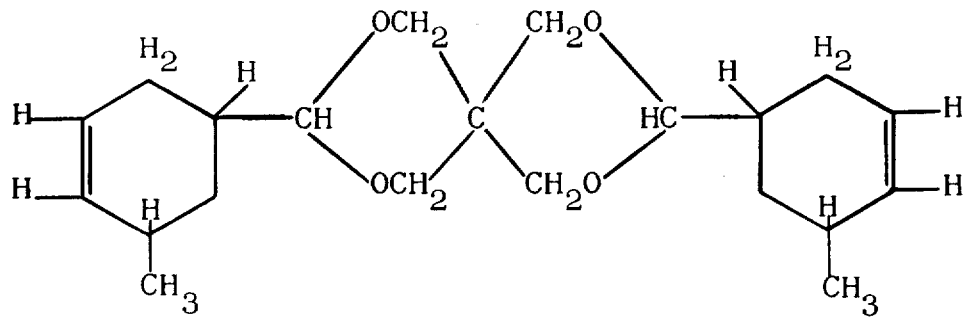

column 4, lines 17 to 20, that portion of the formula should appear as shown below in the patent:

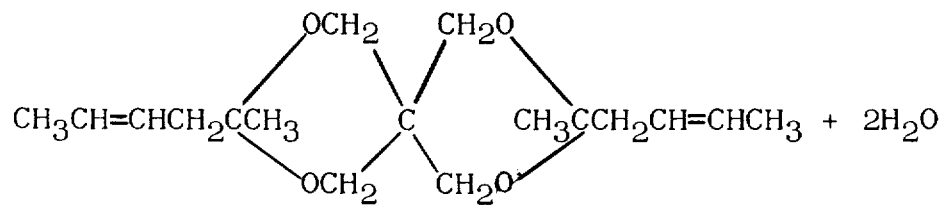

Signed and sealed this 16th day of October 1962.

(SEAL)
Attest:
ERNEST W. SWIDER
Attesting Officer

DAVID L. LADD
Commissioner of Patents